(12) United States Patent
Carrara et al.

(10) Patent No.: US 6,873,285 B2
(45) Date of Patent: Mar. 29, 2005

(54) METHOD AND SYSTEM FOR PROVIDING ALONG-TRACK ALIGNMENT AND FORMATTING OF SYNTHETIC APERTURE RADAR (SAR) DATA, AND SAR IMAGE FORMATION ALGORITHMS USING SUCH METHOD AND SYSTEM

(75) Inventors: Walter G. Carrara, Ann Arbor, MI (US); Rondal S. Goodman, Novi, MI (US); Mark A. Ricoy, Ann Arbor, MI (US)

(73) Assignee: General Dynamics Advanced Information Systems, Inc., Arlington, VA (US)

(*) Notice: Subject to any disclaimer, the term of this patent is extended or adjusted under 35 U.S.C. 154(b) by 0 days.

(21) Appl. No.: 10/615,687

(22) Filed: Jul. 9, 2003

(65) Prior Publication Data

US 2005/0007269 A1 Jan. 13, 2005

(51) Int. Cl.[7] ................................................. G01S 13/90
(52) U.S. Cl. .................. 342/25 R; 342/25 D; 342/194; 342/195; 342/196
(58) Field of Search ........................... 342/25, 89, 175, 342/192–197, 161–162; 382/48, 109, 293, 25 R, 25 A–25 F

(56) References Cited

U.S. PATENT DOCUMENTS

| | | | |
|---|---|---|---|
| 4,191,957 A | | 3/1980 | Walker et al. |
| 5,708,436 A | | 1/1998 | Loiz et al. |
| 5,812,082 A | | 9/1998 | Moreira et al. |
| 5,898,399 A | | 4/1999 | Carrara et al. |
| 6,018,306 A | | 1/2000 | Serbin |
| 6,020,843 A | | 2/2000 | Krikorian et al. |
| 6,037,892 A | | 3/2000 | Nikias et al. |
| 6,046,695 A | | 4/2000 | Poehler et al. |
| 6,072,419 A | * | 6/2000 | Normant ..................... 342/25 |
| 6,088,295 A | | 7/2000 | Altes |
| 6,208,283 B1 | * | 3/2001 | Murata et al. ................. 342/25 |
| 6,222,933 B1 | * | 4/2001 | Mittermayer et al. ........ 382/109 |
| 6,255,981 B1 | | 7/2001 | Samaniego |
| 6,424,287 B1 | | 7/2002 | Doerry et al. |
| 6,603,424 B1 | * | 8/2003 | Abatzoglou ................... 342/25 |
| 6,646,593 B1 | * | 11/2003 | Garren ....................... 342/179 |
| 6,661,369 B1 | * | 12/2003 | Cho ............................ 342/25 |
| 6,670,907 B2 | * | 12/2003 | Cho ............................ 342/25 |
| 2002/0044079 A1 | | 4/2002 | Meyer-Hilberg | |

OTHER PUBLICATIONS

Charles et al., "Performance of the Polar Formatting Algorithm for SAR Image Formation on Wide Aperture Collections", Jun. 8, 2000, pp. 1–6.*

Spotlight SAR Data Focusing Based on a Two-Step Processing Approach, IEEE Transactions on Geoscience and Remote Sensing, vol. 39, No. 9, Sep. 2001, pp. 1993–2004.

New Approach for Hybrid Strip–Map/Spotlight SAR Data Focusing, IEE Proc.–Radar, Sonar Navig., vol. 148, No. 6, Dec. 2001, R. Lanari, S. Zoffoli, E. Sansosti, G. Fornaro, and F. Serafino.

* cited by examiner

Primary Examiner—Thomas H. Tarcza
Assistant Examiner—Isam Alsomiri

(57) ABSTRACT

An along-track alignment and formatting system (ATAFS) formats synthetic aperture radar (SAR) data to align and format signals from scatterers in a scene to achieve an ideal data format in the along-track dimension in which such ideal data format leads to improved image quality of an image based on the SAR data and/or reduced computational burden for generating an image based on the SAR data. Two aspects of the ATAFS include: 1) the division of data stabilization into two distinct steps; and 2) the along-track (or slow-time) migration of signal support of scatterers as a function of their along-track location. A suite of SAR image formation algorithms use the ATAFS in conjunction with conventional signal processing stages to transform input coherent signal data into a complex image with image quality and geometric accuracy commensurate with the inherent information content of the input data.

21 Claims, 15 Drawing Sheets

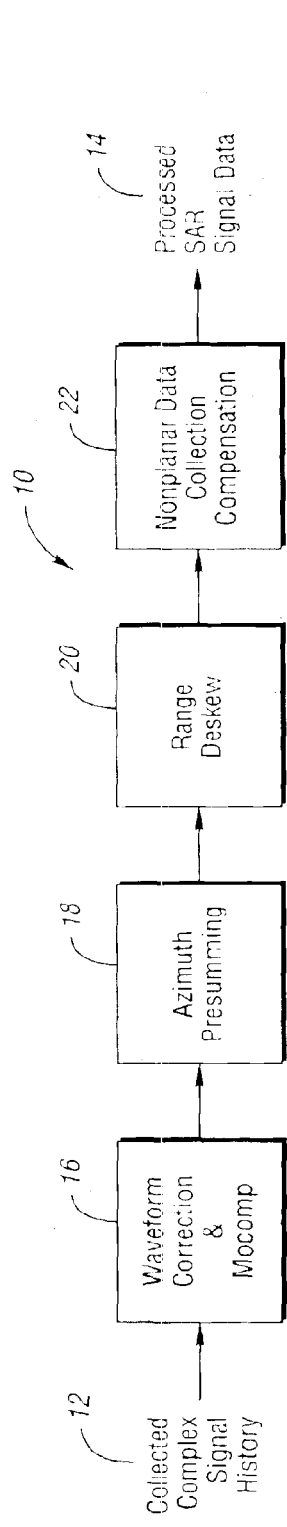
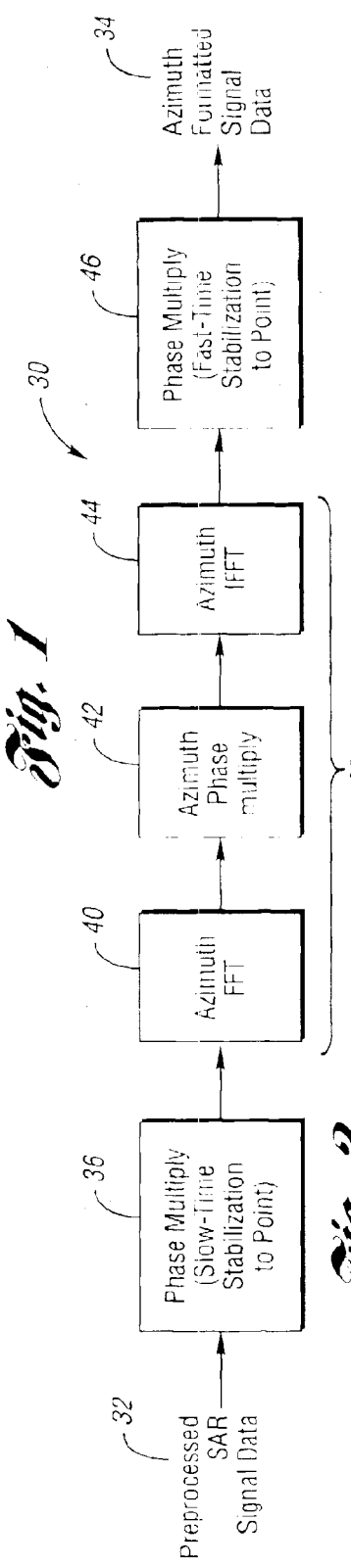
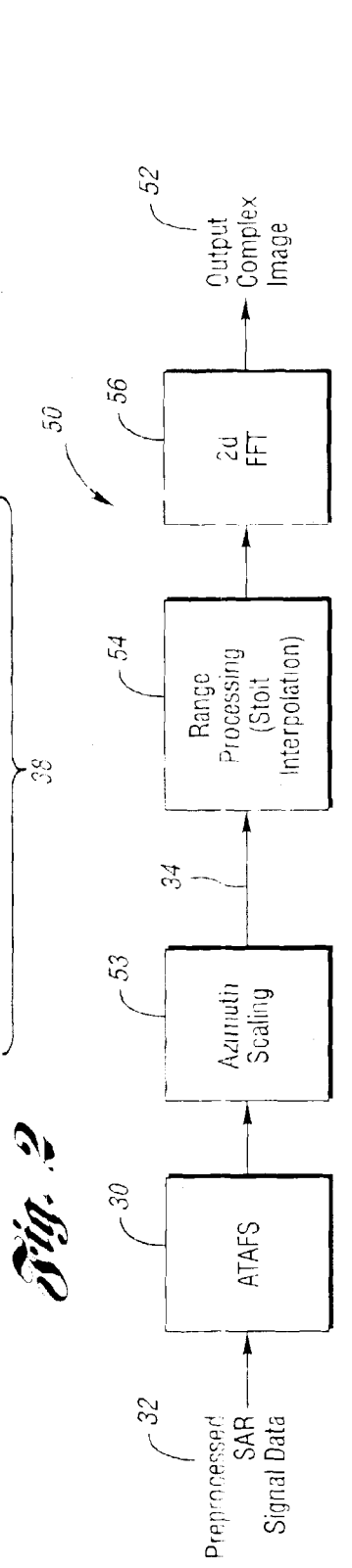

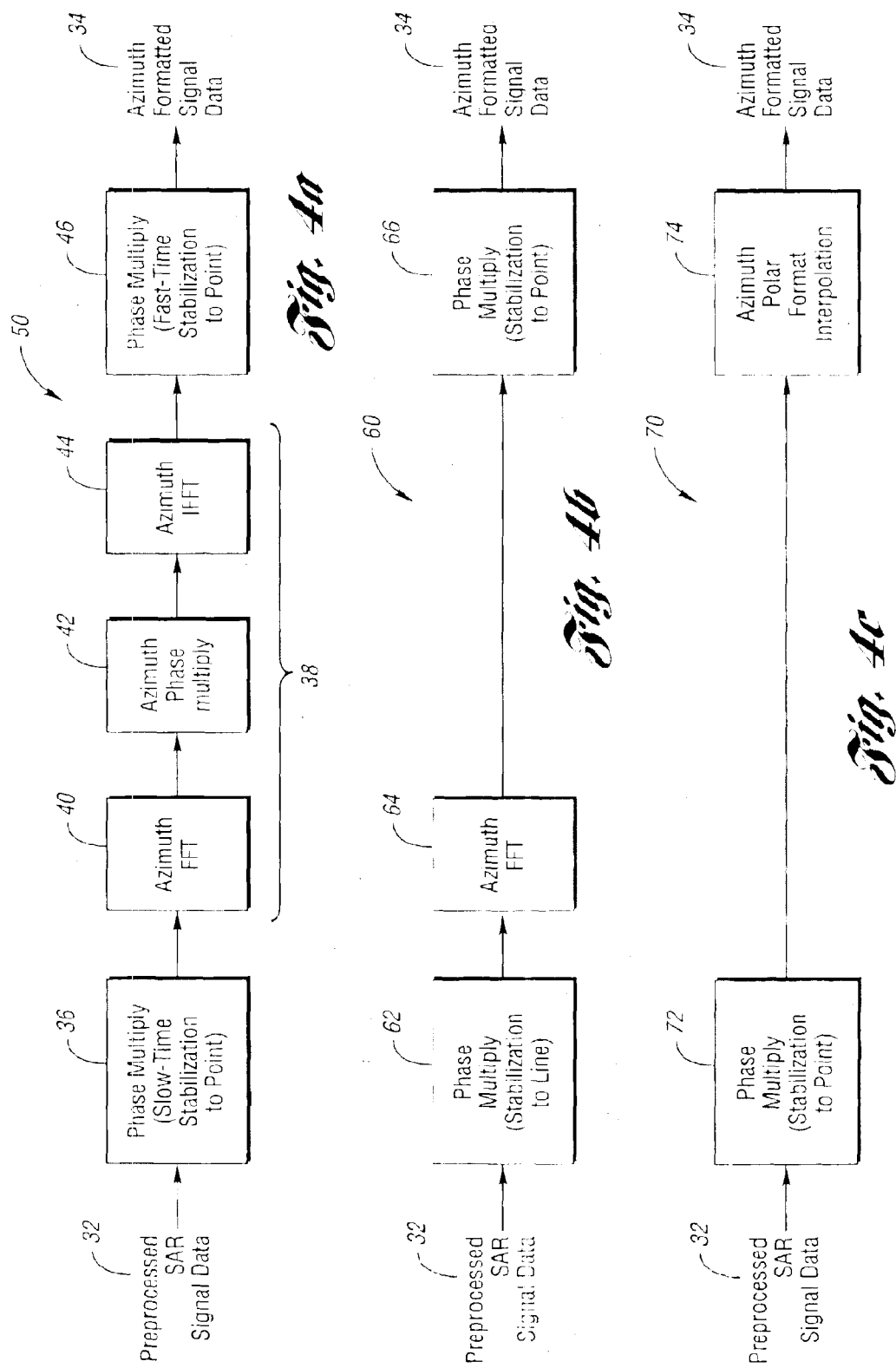

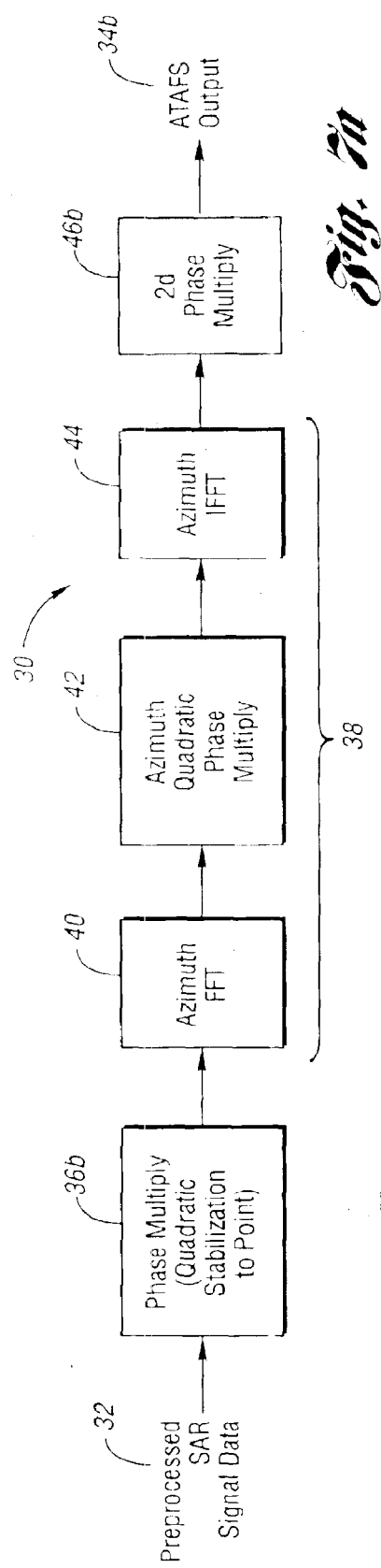
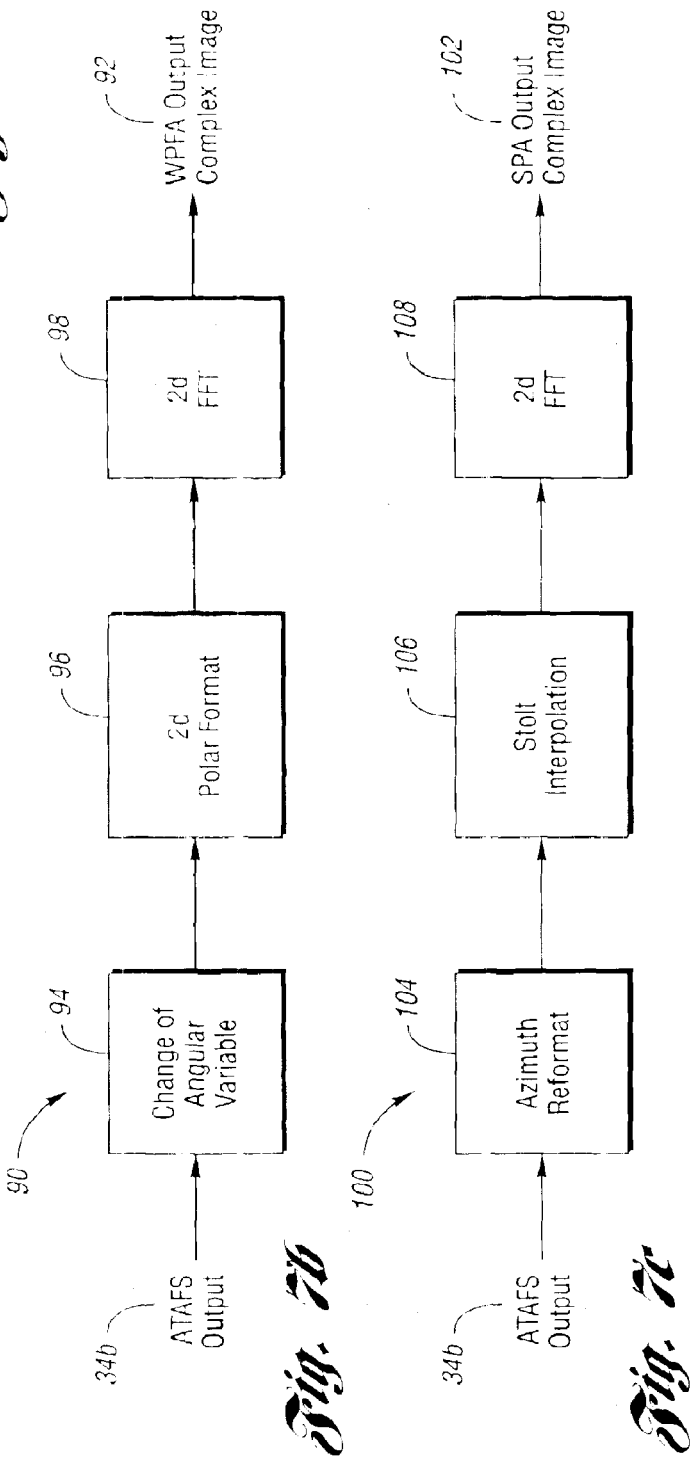
Fig. 7a
Fig. 7b
Fig. 7c

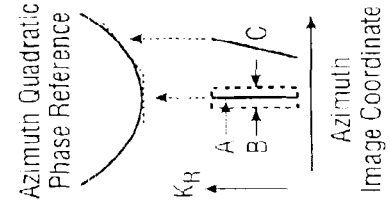
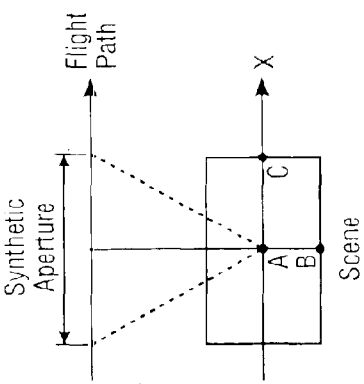
Fig. 17a
Fig. 17b
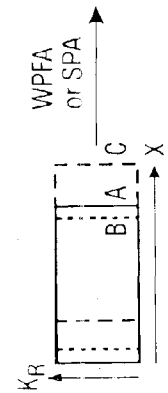
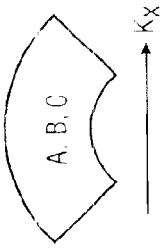
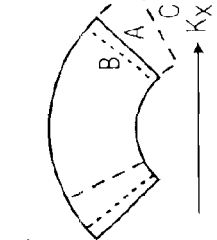
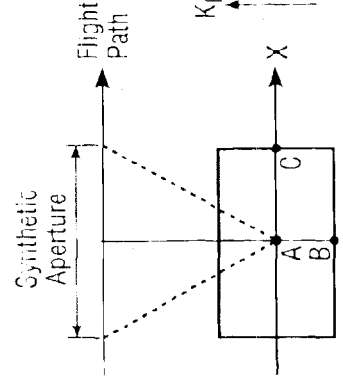
Fig. 18

US 6,873,285 B2

METHOD AND SYSTEM FOR PROVIDING ALONG-TRACK ALIGNMENT AND FORMATTING OF SYNTHETIC APERTURE RADAR (SAR) DATA, AND SAR IMAGE FORMATION ALGORITHMS USING SUCH METHOD AND SYSTEM

BACKGROUND OF THE INVENTION

1. Field of the Invention

The present invention relates generally to a method and system for manipulating, formatting, and subsequently processing synthetic aperture radar (SAR) data and other coherent signal data into complex imagery with image resolution and geometric accuracy commensurate with the inherent information content of the data. More particularly, the present invention relates to a method and system for providing along-track alignment and formatting of coherent SAR data in which such method and system manipulate the coherent SAR data in order to align and format signals from individual scatterers to achieve an ideal data storage format in the along-track dimension.

2. Background Art

Image formation processors generate images from scenes sensed by synthetic aperture radar (SAR) sensors. A SAR sensor transmits electromagnetic signals such as pulses towards a scene while the SAR sensor is moving with respect to the scene. The SAR sensor receives a portion of the transmitted signal which has been reflected from a scatterer in the scene back towards the SAR sensor. An image formation processor analyzes data indicative of the reflected signal portions received by the SAR sensor from the scatterers in the scene in order to generate an image representative of the scene.

Data formatting is an important element in the performance of a fine resolution SAR image formation processor. SAR image formation processors attempt to format the incoming data indicative of the reflected signal portions and the movement of the SAR sensor in various ways in order to optimize the success of the signal processing and image formation operations. The objective of data format operations within a SAR image formation algorithm is to establish the data appropriately in a wavenumber or spatial frequency domain ($K_X$, $K_Y$) such that a subsequent two-dimensional (2d) Fourier transform yields undistorted diffraction-limited imagery of complex three-dimensional scenes.

Current SAR image formation algorithms include the rectangular format algorithm (RFA), the polar format algorithm (PFA), the range migration algorithm (RMA), the chirp scaling algorithm (CSA), and the frequency scaling algorithm (FSA). The RFA, the PFA, and the RMA, in order, offer a progression from a simplistic format to an ideal format; from limited scene size and image quality to large seamless images at excellent image quality; and from minimum computational cost to an often-excessive computational burden. CSA and FSA are attempts to reduce the complexity and/or computational burden of RMA at the expense of image quality.

The way in which each SAR image formation algorithm addresses data formatting defines the nature of the algorithm and affects its area of applicability, its limitations, and its computational complexity. Often, it is computational complexity that drives the search for improvements in a SAR image formation algorithm that already provides satisfactory image quality. This search typically involves a tradeoff between image quality and computational burden. Another consideration is the ease of implementation. The RFA operates with minimum need for auxiliary data and minimum sensitivity to its accuracy. However, the RFA formats the data properly in neither range nor azimuth; the PFA requirements are moderate, well understood and manageable. It formats the data properly only from scene center; the RMA formats the data properly in both range and azimuth from all target locations.

The RMA is potentially the ideal algorithm for fine-resolution SAR imaging of large scenes in the most challenging data collection environments. A disadvantage of the RMA is that the RMA must operate on azimuth chirped signal data. That is, the starting point of the RMA is a signal history with data stabilization to a sliding reference point (that is, data stabilization to a line). For SAR systems in which the azimuth extent of a processed image is smaller than the synthetic aperture length required to achieve the desired azimuth resolution, this starting point leads to an unnecessarily high along-track sampling rate at the front-end of the RMA processor because the total Doppler bandwidth (required for azimuth resolution) is larger than the azimuth-dechirped scene bandwidth in these cases. For some imaging geometries (in particular, ultrawide-angle strip map and fine-resolution spotlight imaging), excess azimuth sampling on the order of 10:1 or higher may be necessary. Such large over-sampling of signal history data represents a large computational burden on the image formation processor.

Additionally, the RMA requires a one-dimensional (range) precision interpolation which is known as the Stolt interpolation. The RFA requires no interpolation; and the PFA requires both an azimuth interpolation and a range interpolation. Both the CSA and the FSA follow the RMA in azimuth, but trade image quality to avoid the need for even the Stolt interpolation in range.

SUMMARY OF THE INVENTION

Accordingly, it is an object of the present invention to provide an along-track alignment and formatting system (ATAFS) and associated method which format synthetic aperture radar (SAR) data in order to align and format signals from individual scatterers in a scene to achieve an ideal data format in the along-track dimension in which such ideal data format in the along-track dimension leads to improved image quality and/or reduced computational burden for generating an image based on the SAR data.

It is another object of the present invention to provide a data formatting algorithm such as the ATAFS in which two general aspects enable SAR data to be aligned and formatted in the ideal format in the along-track dimension: 1) the division of data stabilization to a point into two distinct steps; and 2) the along-track (or slow-time) migration of signal support of scatterers as a function of their along-track location.

It is a further object of the present invention to provide a suite of novel SAR image formation algorithms which use the ATAFS in conjunction with conventional signal processing stages to transform input coherent signal data into a complex image with image quality and geometric accuracy commensurate with the inherent information content of the input data.

It is still another object of the present invention to provide a first novel SAR image formation algorithm identified herein as the differential Doppler algorithm (DDA) which uses the ATAFS in conjunction with conventional signal processing stages to transform input coherent signal data into a complex image with image quality and geometric accuracy commensurate with the information content of the input data.

It is still a further object of the present invention to provide a second novel SAR image formation algorithm identified herein as the radar survey processor (RSP) algorithm which uses the ATAFS in conjunction with conventional signal processing stages to transform input coherent signal data into a complex image with a computational burden compatible with real-time survey or field processing and with image quality and geometric accuracy greatly improved over that of the RFA although degraded with respect to the information content of the input data.

It is still yet another object of the present invention to provide a third novel SAR image formation algorithm identified herein as the widefield polar format algorithm (WPFA) which uses the ATAFS in conjunction with conventional signal processing stages to transform input coherent signal data into a complex image with image quality and geometric accuracy commensurate with the information content of the input data.

It is still yet a further object of the present invention to provide a fourth novel SAR image formation algorithm identified herein as the Stolt polar algorithm (SPA) which uses the ATAFS in conjunction with conventional signal signal data into a complex image with image quality and geometric accuracy commensurate with the information content of the input data.

In carrying out the above objects and other objects, the present invention provides a method of generating a synthetic aperture radar (SAR) image from a SAR (in either spotlight, scan, strip map, or inverse SAR mode) signal. The SAR signal is indicative of a scene having a multitude of point scatterers and distributed area scatterers. The method includes performing a first partial data stabilization to a point operation on the SAR signal to generate a partially stabilized SAR signal. An along-track migration operation is then performed on the partially stabilized SAR signal to migrate SAR signal support of the scatterer in the scene as a function of along-track location of the scatterer in the scene in order to generate an along-track aligned partially stabilized SAR signal. A second partial data stabilization to a point operation is then performed on the along-track aligned partially stabilized SAR signal in order to complete the performance of the data stabilization to a point operation on the SAR signal and thereby generate an azimuth aligned and partially or fully azimuth formatted SAR signal. The azimuth aligned and partially or fully azimuth formatted SAR signal is then processed to generate the SAR image.

The SAR signal may have an azimuth chirp associated with a center transmitter frequency. As such, in a constant parameter case of the method, the step of performing the first partial data stabilization to a point operation on the SAR signal includes removing the quadratic component of the azimuth chirp associated with the center transmitter frequency of the SAR signal from the SAR signal associated with each transmitter frequency to generate the partially stabilized SAR signal. In a variable parameter case of the method, the step of performing the first partial data stabilization to a point operation on SAR signal includes removing the quadratic component of the azimuth chirp associated with each transmitter frequency of the SAR signal from the SAR signal associated with that transmitter frequency to generate the partially stabilized SAR signal.

The SAR signal may include pulses each having an azimuth chirp associated with a center transmitter frequency and each having a fast-time frequency. As such, in the constant parameter case, the step of performing the first partial data stabilization to a point operation on the SAR signal is equivalent to performing a pulse-by-pulse phase shift without affecting the fast-time frequency of the pulses of the SAR signal in order to remove from the pulses of the SAR signal the quadratic component of the azimuth chirp associated with the center transmitter frequency. In the variable parameter case, the step of performing the first partial data stabilization to a point operation on the SAR signal corresponds to performing a pulse-by-pulse phase shift and adjusting the fast-time frequency of the pulses of the SAR signal in order to remove from the pulses the quadratic component of the azimuth chirp associated with each transmitter frequency.

The step of processing the azimuth aligned and fully azimuth formatted SAR signal in the constant parameter case to generate the SAR image may include performing a Stolt (range) interpolation operation on the azimuth aligned and fully azimuth formatted SAR signal to generate an azimuth and range formatted SAR signal, and performing an azimuth and range fast Fourier transform on the azimuth and range formatted SAR signal in order to generate the SAR image. In this case, the present invention provides the novel DDA.

The step of processing the azimuth aligned and fully azimuth formatted SAR signal in the constant parameter case to generate the SAR image may include performing on the azimuth aligned and fully azimuth formatted SAR signal, in order, a range fast Fourier transform, a two-dimensional phase multiply, and an azimuth fast Fourier transform in order to generate the SAR image. In this case, the present invention provides the novel RSP algorithm.

The step of processing the azimuth aligned and partially azimuth formatted SAR signal in the variable parameter case to generate the SAR image may include performing a polar format algorithm range interpolation operation on the azimuth aligned and partially azimuth formatted SAR signal in order to generate the SAR image. In this case, the present invention provides the novel WPFA.

The step of processing may include performing an azimuth interpolation and a Stolt interpolation followed by an azimuth and range fast Fourier transform on the azimuth aligned and partially azimuth formatted SAR signal in the variable parameter case in order to generate the SAR image. In this case, the present invention provides the novel SPA.

The advantages accruing to the present invention are numerous. For instance, the present invention provides novel SAR image formation algorithms that enhance the production of fine-resolution, large-area SAR images. These novel SAR image formation algorithms offer distinct advantages over current SAR image formation algorithms with such advantages including improved image quality and/or reduced computational burden. Such advantages lead to a lower system cost relative to the cost of systems using current SAR image formation algorithms.

For example, the image quality of the novel differential Doppler algorithm provided by the present invention is comparable to that of the RMA while its computational burden is lower for some SAR applications. The image quality of the novel RSP is superior to that of the RFA and approaches that of the conventional PFA, yet requires no interpolation operations. The image quality of the novel WPFA is comparable to that of the RMA and superior to that of the conventional PFA. The image quality of the novel SPA is comparable to that of the RMA and superior to that of the conventional PFA. Each novel SAR image formation algorithm removes the azimuth chirp associated with the SAR signal in order to minimized computational burden. In addition to SAR, potential areas of application for each novel algorithm disclosed herein include seismic imaging, medical imaging, and ultrasonic imaging (sonar).

BRIEF DESCRIPTION OF THE DRAWINGS

FIG. 1 illustrates a block diagram summarizing the basic fine resolution synthetic aperture radar (SAR) pre-processing operations which are common to most SAR image formation algorithms;

FIG. 2 illustrates a block diagram of the stages of an along-track alignment and formatting system (ATAFS) in the constant parameter case in accordance with the present invention;

FIG. 3 illustrates a block diagram of the stages of a first novel SAR image formation algorithm identified herein as the differential Doppler algorithm (DDA) which uses the ATAFS in the constant parameter case to generate an image;

FIGS. 4a, 4b, and 4c illustrate respective block diagrams of the azimuth channel stages of the novel DDA, the prior art RMA, and the prior art PFA;

FIGS. 7a, 7b, and 7c respectively illustrate block diagrams of the stages of the ATAFS for the variable parameter case, the stages of the WPFA, and the stages of the SPA;

FIGS. 17a and 17b illustrate ATAFS operation within the novel WPFA and SPA; and

FIG. 18 illustrates support of signals through the ATAFS operation and polar formatting in the novel WPFA and SPA.

DETAILED DESCRIPTION OF THE PREFERRED EMBODIMENT(S)

Figure 5A:
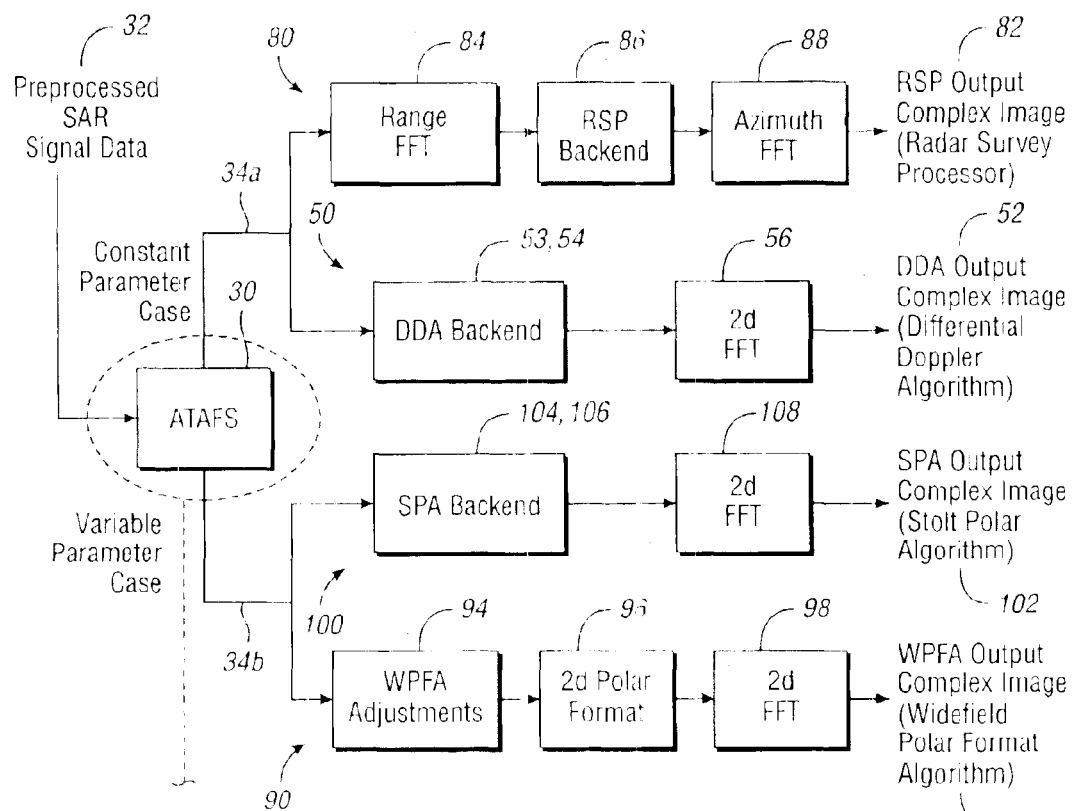
FIG. 5a illustrates a block diagram of the stages of the DDA, a second novel SAR image formation algorithm identified herein as the radar survey processor (RSP) algorithm, a third novel SAR image formation algorithm identified herein as the widefield polar format algorithm (WPFA), and a fourth novel SAR image formation algorithm identified herein as the Stolt polar algorithm (SPA) in which each image formation algorithm uses the ATAFS to generate an image.

Referring now to FIG. 1, a block diagram 10 illustrating a summary of the basic fine resolution synthetic aperture radar (SAR) pre-processing operations which are common to most SAR image formation algorithms is shown. In general, these basic operations convert a collected complex signal history 12 into a pre-processed signal history 14. The basic operations may include a waveform correction and motion compensation operation 16; an azimuth pre-summing operation 18; a range deskew operation 20; and a non-planar data collection compensation operation 22. The motion compensation operation includes phase adjustments based on sensor motions that deviate from a straight line path.

A data stabilization operation often follows the preprocessing operations of block diagram 10. Data stabilization to a point and data stabilization to a line are the common variations of this operation. As will be described in greater detail below, the present invention provides a suite of novel SAR image formation algorithms in which in each novel SAR image formation algorithm a data stabilization operation following preprocessor operation 22 differs from the data stabilization operations performed in known SAR image formation algorithms.

These novel SAR image formation algorithms use a novel along-track alignment and formatting system (ATAFS) and associated method provided by the present invention. In the ATAFS, the data stabilization operation differs from the data stabilization operations performed by known SAR image formation algorithms. The data stabilization operation differs from the motion compensation operation in the preprocessor. Data stabilization accounts for the phase effects in the collected data introduced by the nominal straight line path of the radar sensor.

The ATAFS formats SAR data in order to align and format signals from individual scatterers in a scene to achieve an ideal data format in the along-track dimension. The novel SAR image formation algorithms use the aligned and formatted SAR data from the ATAFS in order to generate an image. The image quality of the image generated by the novel SAR image formation algorithms is similar to the image quality generated by known SAR image formation algorithms. Based on the ATAFS, the novel SAR image formation algorithms have the potential to use less computation to generate the image in some situations than the computation used by known SAR image formation algorithms which produce the same image quality. As such, a variation in data stabilization is basic to the ATAFS and the novel SAR image formation algorithms which employ the ATAFS.

Referring now to FIG. 2, a block diagram of the stages of ATAFS 30 in accordance with the present invention (in the constant parameter case which is appropriate for the novel DDA and the novel RSP) is shown. In general, the constant parameter case of ATAFS 30 converts pre-processed SAR signal data 32 into fully azimuth formatted signal data 34 at the ATAFS output. To this end, ATAFS 30 is a one-dimensional technique having two aspects which include: 1) the division of data stabilization to a fixed reference point into two distinct steps (steps 36 and 46 shown in FIG. 2); and 2) the along-track (or slow-time) migration of the signal support of scatterers as a function of their along-track location (stage 38 including steps 40, 42, and 44 shown in FIG. 2). In the constant parameter case, this migration occurs while the phase history data is being reformatted in azimuth.

The first step 36 of data stabilization to the point (i.e., the slow-time data stabilization component) removes the azimuth chirp associated with the center transmitter frequency (fc) from all pulses. First data stabilization step 36 performs a pulse-by-pulse phase shift without affecting the fast-time frequency. Thus, unlike the common data stabilization to a point operation associated with prior art spotlight processing algorithms, first data stabilization step 36 does not compensate for the range curvature of a scene center scatterer. However, first data stabilization step 36 does remove the high bandwidth azimuth chirp and the associated need for a correspondingly high azimuth sampling rate required by prior art RMA, CSA, and FSA processing channels.

An along-track migration stage 38 then performs, after the data stabilization function provided by first data stabilization step 36, the along-track (or slow-time) migration of the signal support of scatterers as a function of their along-track location. To this end, along-track migration stage 38 includes in the following order: an azimuth fast-Fourier transform (FFT) step 40; an azimuth phase multiply step 42; and an azimuth inverse FFT step 44. After the partial data stabilization provided by first data stabilization step 36, azimuth FFT step 40 is used to reach a nominal azimuth image domain (which is referred to later herein as the "hourglass" domain because of the shape of the support of a single target in the domain). Scatterers are not completely compressed in azimuth after azimuth FFT step 40 because of the presence of differential Doppler bandwidth and range curvature. Analogous to a common range deskew operation, azimuth phase multiply step 42 multiplies the output of azimuth FFT step 40 by an appropriate azimuth quadratic phase function to migrate the slow-time signal support of each scatterer in a desirable fashion after azimuth inverse FFT step 44 is applied.

Second data stabilization step 46 operates in fast time to complete the process of data stabilization to the fixed reference point. After the data stabilization process is completed, second data stabilization step 46 generates azimuth formatted signal data 34 at the ATAFS output.

Referring now to FIG. 3, a block diagram of the stages of a first novel SAR image formation algorithm identified herein as the differential Doppler algorithm (DDA) 50 is shown. In general, DDA 50 uses ATAFS 30 in conjunction with conventional signal processing stages to transform pre-processed SAR signal data 32 into a complex image 52 having an image quality and geometric accuracy commensurate with the information content of input data 32.

DDA 50 includes an azimuth scaling step 53 which follows ATAFS 30 in front of a one-dimensional range processing step 54. Range processing step 54 is a Stolt interpolation which follows azimuth scaling step 53. Stolt interpolation step 54 interpolates in range the azimuth formatted and scaled signal data 34 generated by azimuth scaling step 53. The final step of DDA 50 is a two-dimensional (2d) FFT step 56 which outputs complex image 52.

Accordingly, in DDA 50, the azimuth and range processing are separable one-dimensional operations. The azimuth processing provided by ATAFS 30 precedes the range processing provided by Stolt interpolation step 54. DDA 50 exceeds the focusing capability of the prior art polar format algorithm (PFA) and approaches the focusing capability of the prior art RMA. DDA 50 does not need to maintain the azimuth chirp (i.e., data stabilization to a line) and the corresponding high azimuth sampling rate and computational burden required by the prior art RMA.

Referring now to FIGS. 4a, 4b, and 4c, respective block diagrams of the azimuth channel stages of DDA 50, prior art RMA 60, and prior art PFA 70 are shown. As described above and as shown in FIG. 4a, DDA 50 includes the procedure of ATAFS 30 in order to convert signal data 32 into azimuth formatted signal data 34. Prior art RMA 60 includes a data stabilization to line operation 62, an azimuth FFT operation 64, and a data stabilization to point operation 66 to convert signal data 32 into azimuth formatted signal data 34. As shown from a comparison of FIGS. 4a and 4b, the procedure of ATAFS 30 is a substitute operation for the initial azimuth FFT and subsequent matched-filter phase multiply of prior art RMA 60. Prior art PFA 70 includes a data stabilization to point operation 72 and an azimuth polar format interpolation 74 to convert signal data 32 into azimuth formatted signal data 34.

DDA 50, prior art RMA 60, and prior art PFA 70 each have identical range processing operations. However, unlike PFA 70, both DDA 50 and prior art RMA 60 have properly migrated the signals in azimuth to completely account for range curvature after the range processing. After the range processing operation, image formation of each algorithm concludes with the usual two-dimensional (2d) Fourier transform to generate a complex image from the two-dimensional spatial frequency data.

Azimuth polar format interpolation 74 of prior art PFA 70 is shown in FIG. 4c as being performed separately and before the range polar format interpolation to make the point that these three algorithms (DDA 50, prior art RMA 60, and prior art PFA 70) have identical range processing. In practice, operational implementations of prior art PFA 70 usually first perform re-sampling in range followed by re-sampling in azimuth.

Referring now to FIG. 5a, a block diagram of the stages of DDA 50, a second novel SAR image formation algorithm identified herein as the radar survey processor (RSP) algorithm 80, a third novel SAR image formation algorithm identified herein as the widefield polar format algorithm (WPFA) 90, and a fourth novel SAR image formation algorithm identified herein as the Stolt polar algorithm (SPA) 100 is shown. As described above with reference to DDA 50, the DDA, WPFA 90, and SPA 100 use ATAFS 30 in conjunction with conventional signal processing stages to transform pre-processed SAR signal data 32 into respective complex images 52, 92, and 102 having image quality and geometric accuracy commensurate with the information content of input data 32. RSP algorithm 80 uses ATAFS 30 in conjunction with conventional signal processing stages to transform pre-processed SAR signal data 32 into complex image 82 having image quality and geometric accuracy greatly improved over that of the RFA although degraded with respect to the information content of the input data.

As shown in FIG. 5a, ATAFS 30 includes two primary branches differentiated from one another as the constant parameter branch 34a and the variable parameter branch 34b. DDA 50 and RSP algorithm 80 incorporate constant parameter branch 34a of ATAFS 30. Constant parameter branch 34a of ATAFS 30 was described herein with respect to FIG. 2. WPFA 90 and SPA 100 incorporate variable parameter branch 34b which will be described in more detail below.

Figure 5B:
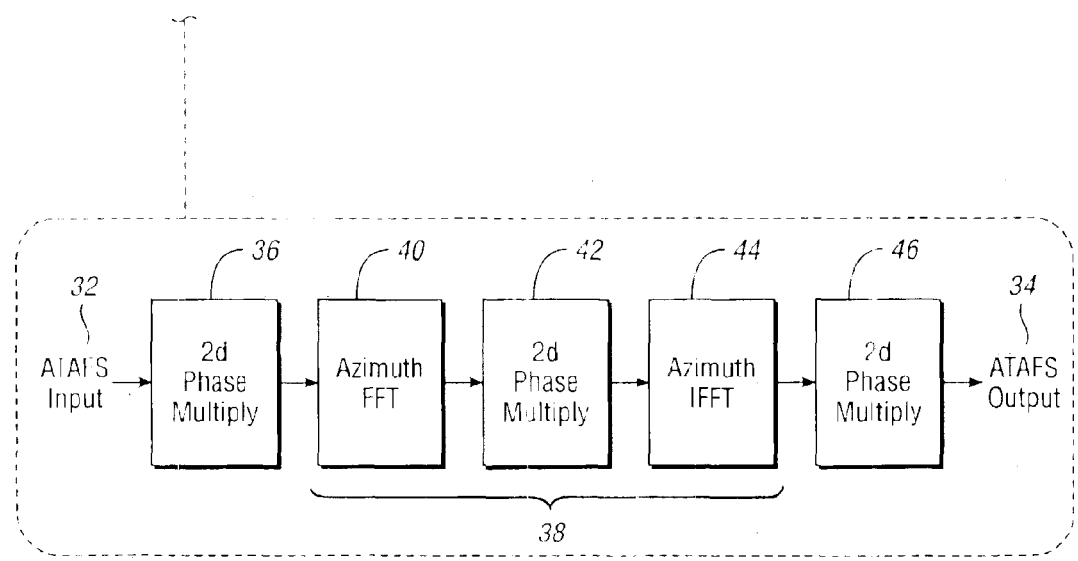
FIG. 5b illustrates a block diagram of the stages of the general ATAFS including both the constant parameter and the variable parameter cases.

WPFA 90 first uses ATAFS 30 and then proceeds with conventional signal processing stages including the standard polar format algorithm (PFA) to transform input signal data 34 into complex image 92. SPA 100 first uses ATAFS 30 and then proceeds with a Stolt (range) interpolation to transform input signal data 34 into complex image 92. For reference with respect to FIG. 5a, FIG. 5b illustrates a block diagram of the stages of the ATAFS.

Figure 6A:
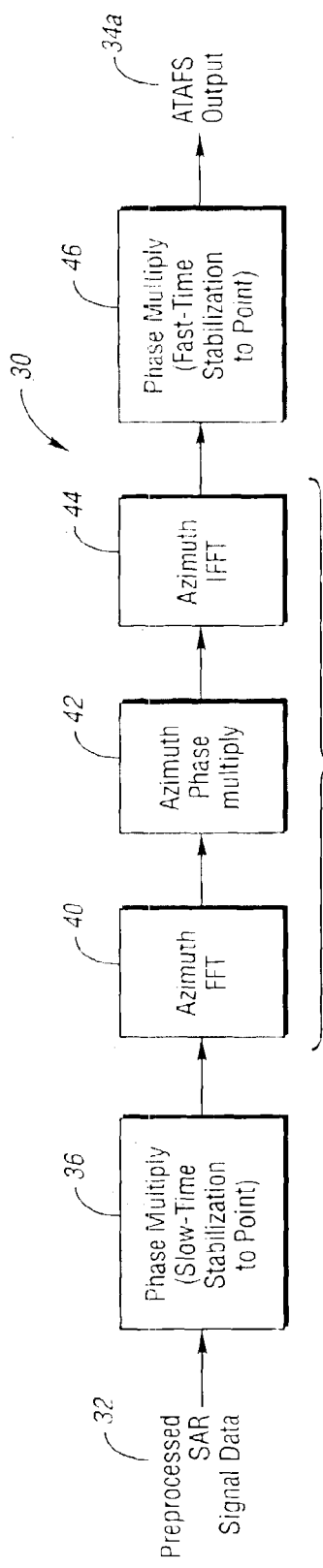
FIGS. 6a, 6b, and 6c respectively illustrate block diagrams of the stages of the ATAFS for the constant parameter case, the stages of the DDA, and the stages of the RSP algorithm.
Figure 6B:
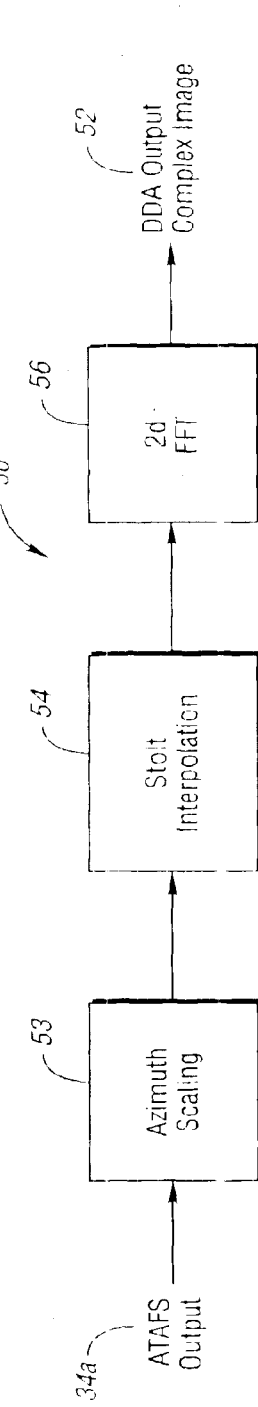
Figure 6C:
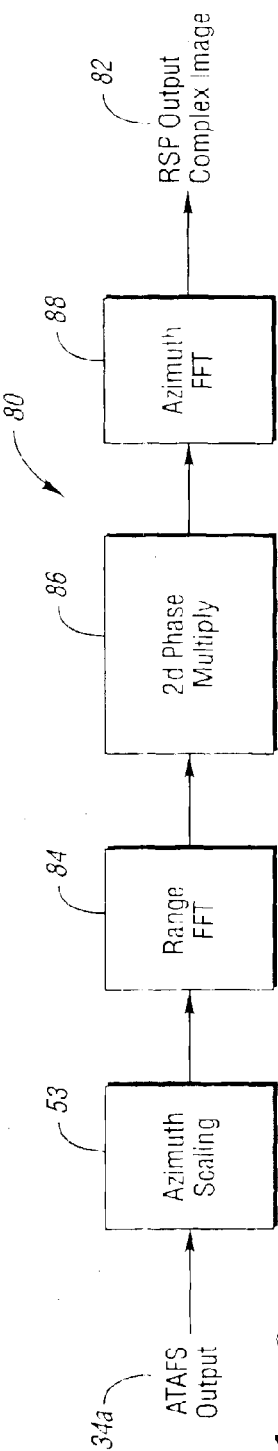

Referring now to FIGS. 6a, 6b, and 6c, respective block diagrams of the stages of the constant parameter case of ATAFS 30, the stages of DDA 50, and the stages of RSP algorithm 80 are shown. DDA 50 and RSP algorithm 80 use the constant parameter mode of ATAFS 30. As in FIG. 3, DDA 50 further includes an azimuth scaling step 53 in front of Stolt (range) interpolation step 54 for receiving ATAFS output 34a.

With reference to FIG. 6c, RSP algorithm 80 is a fast algorithm (in that it involves no interpolation steps) with significant improvement in performance over the standard rectangular format algorithm. RSP algorithm 80 is a highly efficient approach to the formation of overview imagery and field processing. RSP algorithm 80 resembles DDA 50 without Stolt (range) interpolation 54. RSP algorithm 80 substitutes a deterministic, range-dependent azimuth focus operation for Stolt interpolation 54 of DDA 50 which is followed by a 2d FFT to form RSP image 82. The range-dependent azimuth focus operation and the 2d FFT are carried out by range FFT operation 84, 2d phase multiply operation 86, and azimuth FFT operation 88.

RSP image 82 is a substantial improvement over the RFA image and approaches the PFA image in quality in some cases. RSP algorithm 80 avoids any range curvature distortion. This may be a desirable feature in an image formation processor as the need for interpolation to remove geometric distortion is absent. As such, RSP algorithm 80 is a lower performance algorithm having the advantage of a reduced processor load. This characteristic makes RSP algorithm 80 a candidate for use as a real-time survey processor, as a real-time processor in the field, and in similar operational environments with limited processor resources.

Referring now to FIGS. 7a, 7b, and 7c, respective block diagrams of the stages of the variable parameter case of ATAFS 30, the stages of WPFA 90, and the stages of SPA 100 are shown. In general, WPFA 90 and SPA 100 offer advantages over prior art PFA 70 used in fine-resolution, operational SAR imaging systems and prior art RMA 60 used in operational low-frequency, fine resolution operational SAR imaging systems. WPFA 90 and SPA 100 offer improved image quality and scene size relative to prior art PFA 70. The image quality performance of WPFA 90 and SPA 100 is comparable to that of prior art RMA 60 with a computational burden that is lower for some SAR applications.

WPFA 90 and SPA 100 use the variable parameter mode of ATAFS 30. As described above with reference to FIG. 2, ATAFS 30 includes two key aspects in both of the constant and variable operating parameter modes. Again, these aspects are: 1) the division of data stabilization to a point into two distinct steps; and 2) the along-track (or slow-time) migration of the signal support of scatterers as a function of their along-track location (with such migration occurring before reformatting the phase history data).

In the variable operating parameter mode, the first step 36b of data stabilization to the point removes the quadratic component of azimuth chirp associated with the received data as a function of the transmitter frequency. First data stabilization step 36b performs a pulse-by-pulse phase shift and a fast-time frequency adjustment. (In contrast, first data stabilization step 36 in the constant parameter mode performs a pulse-by-pulse phase shift without affecting the fast-time frequency.) Thus, first data stabilization step 36b resembles the common data stabilization to a point operation associated with spotlight mode, although first data stabilization step 36b does not remove the higher-order, non-quadratic components of the azimuth chirp.

Azimuth FFT step 40, azimuth quadratic phase multiply step 42, and azimuth inverse FFT step 44 of along-track migration stage 38 perform, after the data stabilization function provided by first data stabilization step 36b, the along-track (or slow-time) migration of the signal support of scatterers as a function of their along-track location. After the partial data stabilization provided by first data stabilization step 36b, azimuth FFT step 40 transforms the data from first data stabilization step 36b into a range wavenumber by azimuth image domain. Because the preceding phase adjustment approximately removed the azimuth chirp from all targets, these signals are nominally compressed in the azimuth image dimension. Analogous to the common range deskew operation, azimuth quadratic phase multiply step 42 multiplies the output of azimuth FFT step 40 by an appropriate azimuth quadratic phase function to migrate and scale the azimuth signal support in a desirable fashion after azimuth inverse FFT step 44 is applied.

Second data stabilization step 46b removes the non-quadratic components to complete the process of data stabilization to the fixed reference point. After the data stabilization process is completed, second data stabilization step 46b generates azimuth formatted signal data 34b. As such, the pre-processing stage of WPFA 90 and SPA 100 are now complete and signal data 34b is processed using conventional steps of prior art PFA 70 (in the case of WPFA 90) or is processed using a Stolt interpolation (in the case of SPA 100) for interpolation in two dimensions and image formulation.

In the case of WPFA 90, signal data 34b is fed directly into a conventional PFA processing stage. The conventional PFA processing stage includes a change of angular variable step 94 and a 2d polar format step 96. A 2d FFT transform step 98 is then applied to generate complex image 92 from the two-dimensional spatial frequency data input into the 2d FFT transform step.

In the case of SPA 100 (which is a variation of WPFA 90) an azimuth reformatting step 104 follows ATAFS 30 and subsequent range processing includes a one-dimensional Stolt interpolation step 106. The final step is the usual 2d FFT step 108 to generate complex image 102. It is noted that from SPA 100 the range interpolation of the prior art PFA is identical to the Stolt interpolation used in prior art RMA 60.

With reference to FIGS. 17a and 17b, the signals from three point targets within a spotlight scene are examined to illustrate ATAFS operations within WPFA and SPA. As shown in FIG. 17a, point A is located at scene center, point B is offset in range, and point C is offset in azimuth.

FIG. 17b illustrates the application of the second ATAFS phase adjustment in azimuth quadratic phase multiply step 42 following azimuth FFT step 40. At this point, the data resides in a range wavenumber by azimuth image domain that FIG. 17b represents. These signals are nominally compressed in the azimuth image dimension.

The azimuth position of each target's response determines the coefficient of the nearly linear phase it receives from the quadratic phase multiply in azimuth quadratic phase multiply step 42. For example, point A in FIG. 17b receives no linear phase because it is located at the azimuth origin. However, point C receives a large net linear phase because it is offset in azimuth. This azimuth-dependent variation in linear phase causes an azimuth-dependent shift in the 2-D phase history support after the azimuth inverse FFT of ATAFS processing in azimuth inverse FFT step 44. Similarly, the width of each target's response in azimuth determines the amount of quadratic phase it accrues from the quiadratic phase multiply. For example, point B has a wider azimuthal response than does point A. The range offset of point B causes the first ATAFS phase adjustment to incompletely remove its original azimuth chirp, resulting in a slightly defocused azimuth impulse response. Because of its wider azimuthal response, point B accrues a larger quadratic phase over its support than does point A. This variation in quadratic phase causes a range-dependent scaling of the 2-D signal support after the subsequent inverse FFT. In both WPFA and SPA, ATAFS varies the azimuth quadratic phase adjust ment as a function of $K_R$. The final ATAFS phase adjustment in second data stabilization step 46b removes the residual phase left from the quadratic functional form of the initial data stabilization to complete the process of data stabilization to a fixed reference point.

In prior art PFA 70, on ly the scene center receives the proper format. Scatterers at different azimuth locations are at different Doppler cone angles for a specific pulse, but are erroneously polar-formatted at the same angle, that of the scene center scatterer. Similarly, scatterers at different range locations have a slightly different Doppler cone angle for a specific pulse (except at the broadside pulse), but are polar-formatted at the same angle, again, that of the scene center scatterer. Ideally, a point at scene center and one offset only in azimuth have similar but offset polar angular intervals while a point closer to the SAR sensor has a wider angular interval.

Referring to FIG. 18, the differences between WPFA and PFA in positioning and scaling of signal support are shown. FIG. 18 illustrates the 2-D phase history support of three point targets at different locations (shown adjacent to "Data collection domain" in the left hand side of FIG. 18) within a spotlight scene during PFA, WPFA, and SPA image format ion. In spotlight mode, the collected phase history from each target occupies the same support in the (X, $K_R$) domain (shown adjacent to "PH support of point targets"). The upper branch labeled "PFA" shows the conventional PFA in which all targets receive a common format modification and have identical support. The lower branch labeled "WPFA or SPA" depicts WPFA or SPA processing. Here, the spatially-variant format modification migrates and scales the phase history signals in the X (and $K_x$) coordinate so that, with subsequent polar formatting in WPFA 90 (or the SPA 100 alternative), each target response receives the appropriate polar storage format.

WPFA 90 extends the region of performance beyond the limitations of the prior art PFA by accounting for these differences in cone angle among various scatterers. Like prior art RMA 60 and DDA 50, WPFA 90 makes these corrections exactly. As such, WPFA 90 may be viewed as prior art PFA 70 with a pre-processing operation (ATAFS 30) to re-position and re-size the support of returns from various scatterers with respect to each other.

WPFA 90 and SPA 100 exceed the focusing capability of the prior art PFA and approaches that of prior art RMA 60. WPFA 90 and SPA 100 use data stabilization to a point (without the azimuth chirp) and avoid the high azimuth sampling rate and computational burden required by prior art RMA 60 to maintain the azimuth chirp.

In sum, DDA 50, WPFA 90 (including its SPA 100 variation), prior art RMA 60, and prior art PFA 70 have identical range processing steps. However, unlike prior art PFA 70, DDA 50 and WPFA 90 have properly migrated the signals in azimuth to completely account for range curvature after the range processing. Image formation concludes with the usual 2d FFT to generate a complex image from the two-dimensional spatial frequency data.

Demonstration of the Invention: Overview

In order to demonstrate the usefulness of DDA 50 and, in particular, ATAFS 30, the basic simulation parameters listed in the table below were used to demonstrate the effects of the ATAFS.

| | |
|---|---|
| Radar center frequency | 242.4 MHz |
| Range resolution | 1 m |
| Azimuth resolution | 1 m |
| Range scene size | 560 m |
| Azimuth scene size | 500 m |
| Slant range to scene center | 1000 m |
| Depression angle | 0 deg |
| Squint angle | 90 deg |

Figure 8A:
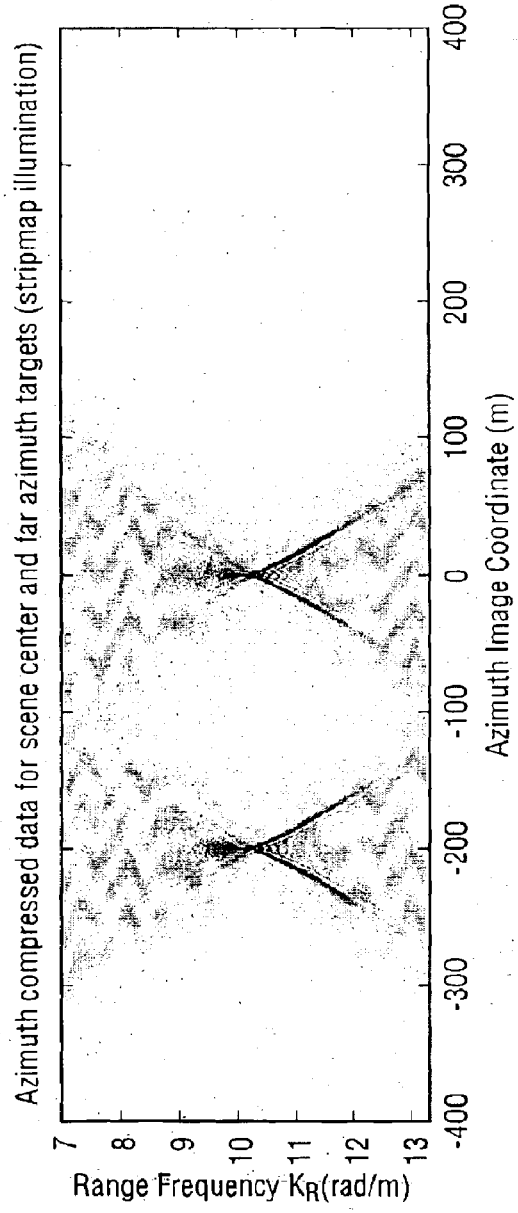
FIGS. 8a and 8b are plots illustrating the effects of the ATAFS on individual point scatterers by showing the magnitude of signals (signal support) from two scatterers at different azimuth positions in a strip map illumination mode.
Figure 8B:
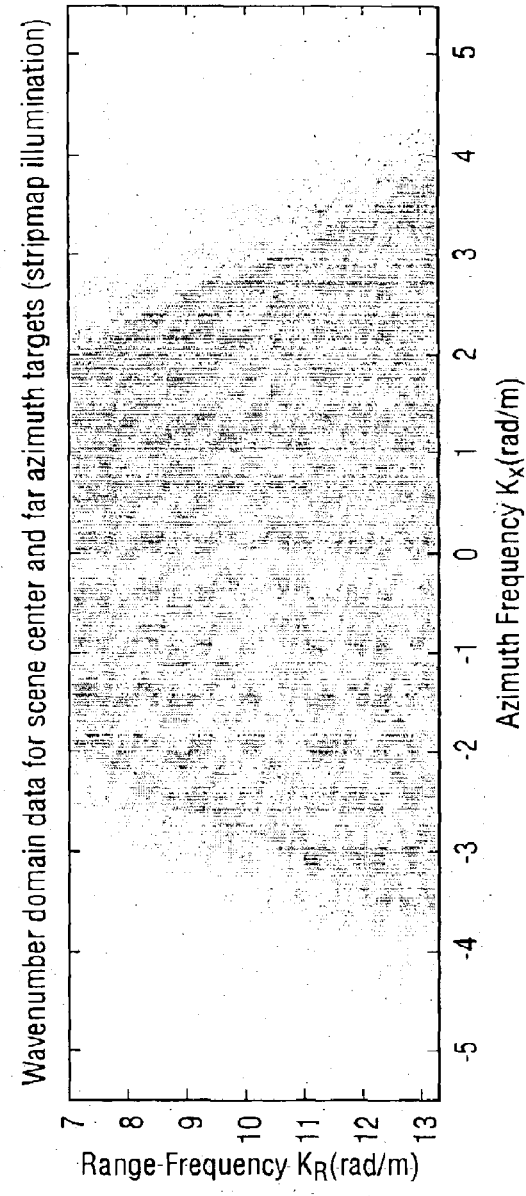

Referring now to FIGS. 8a, 8b, 9a, 9b, 10a, and 10b, the effects of ATAFS 30 on individual point scatterers of the basic simulation are shown. FIGS. 8a and 8b illustrate the magnitude of signals after azimuth FFT 40 and after phase multiply 46 respectively from two scatterers at different azimuth positions (strip map illumination). FIG. 8a illustrates the appearance in the radial wavenumber KR by azimuth image domain of two scatterers at mid range, one at scene center and one at a far (left) azimuth location. Each scatterer's support has an hourglass shape. The support is identical for both scatterers, but shifted in azimuth a distance representing the azimuth separation between the two scatterers in the scene. The pinch point in the radial wavenumber dimension (KR) of the hourglass corresponds to the center transmit frequency used to perform the azimuth data stabilization to a point. The linear spread of the hourglass with range frequency indicates the differential Doppler bandwidth varies with transmit frequency.

FIG. 8b illustrates the signal support for the two scatterers at the completion of ATAFS 30 including a nominal quadratic phase multiply in azimuth and a subsequent azimuth inverse FFT of the hourglass domain data. Because this simulated data represents a strip map antenna pattern, the original supports of the two scatterers are displaced from each other in the collected data by their azimuth separation at the scene. However, FIG. 8b shows that after ATAFS 30 their supports coincide and are flared out at the high frequency end in this radial wavenumber $K_R$ by azimuth wavenumber $K_x$ domain. (In both FIGS. 8a and 8b, the minimum transmit frequency is at the top and the maximum transmit frequency is at the bottom. As such, the ideal azimuth format has been achieved (akin to that of the prior art RMA after the azimuth FFT of the azimuth chirped data and before the Stolt interpolation). At this point, a Stolt interpolation achieves the ideal two-dimensional format required to remove all traces of range curvature and target motion through resolution cells, as does the prior art RMA.

Figure 9A:
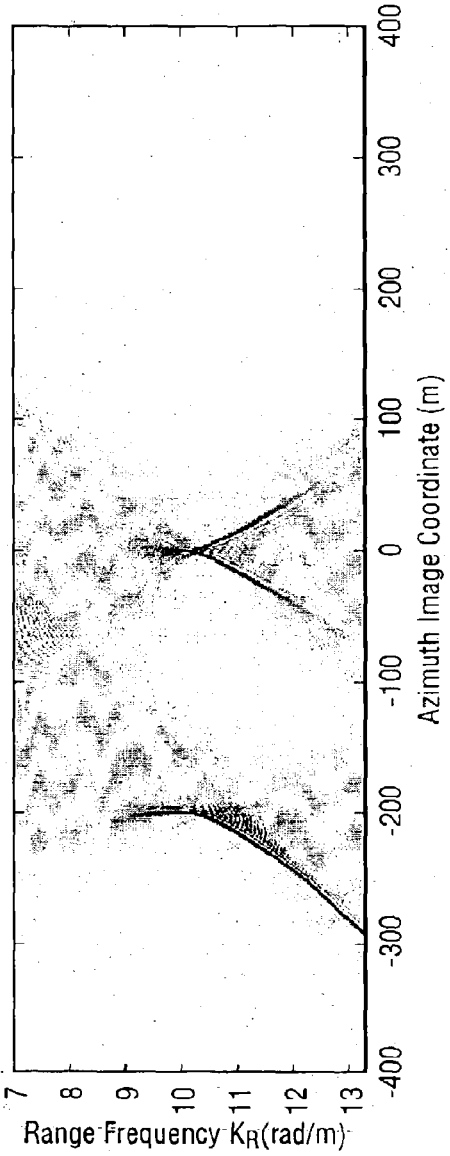
FIGS. 9a and 9b are plots illustrating the effects of the ATAFS on individual point scatterers by showing the magnitude of signals (signal support) from two scatterers at different azimuth positions in a spotlight illumination mode.
Figure 9B:
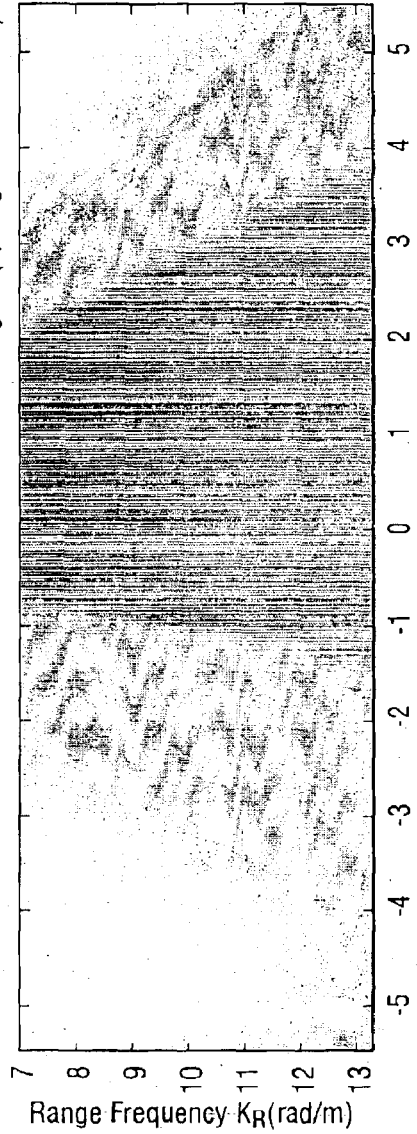

Referring now to FIGS. 9a and 9b, a similar result for the same two scatterers with a spotlight antenna illumination pattern is seen. FIGS. 9a and 9b illustrate the magnitude of signals after azimuth FFT 40 and after phase mulitply 46 respectively from two scatterers at different azimuth positions (spotlight illumination). The spotlight illumination means that the same physical synthetic aperture is common to all scatterers. In both of FIGS. 9a and 9b, the scene center scatterer is naturally identical to the previous strip map case, while the azimuth offset scatterer shows the expected differences between stripmap and spotlight illumination.

Figure 10A:
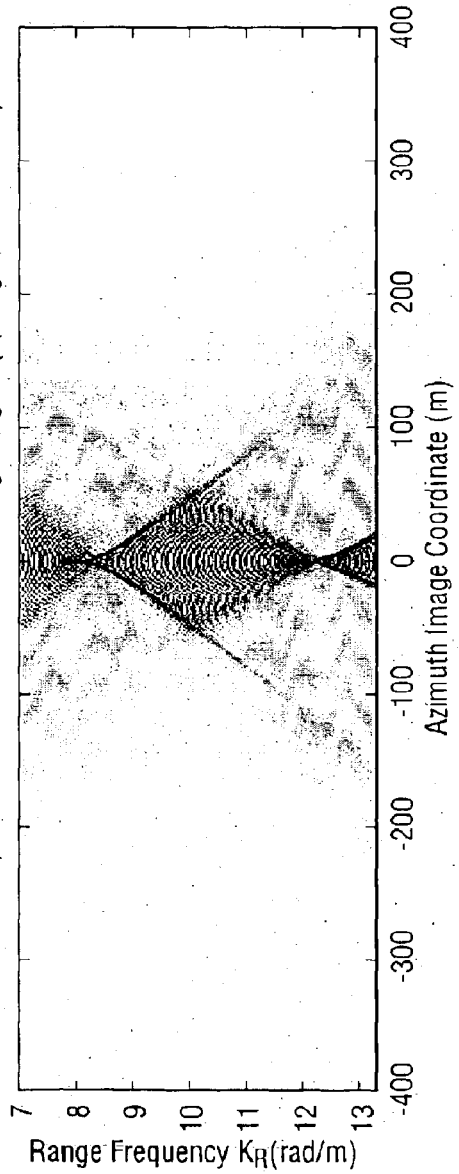
FIGS. 10a and 10b are plots illustrating the effects of the ATAFS on individual point scatterers by showing the magnitude of signals (signal support) from two scatterers at near and tar range positions in a spotlight illumination mode.
Figure 10B:
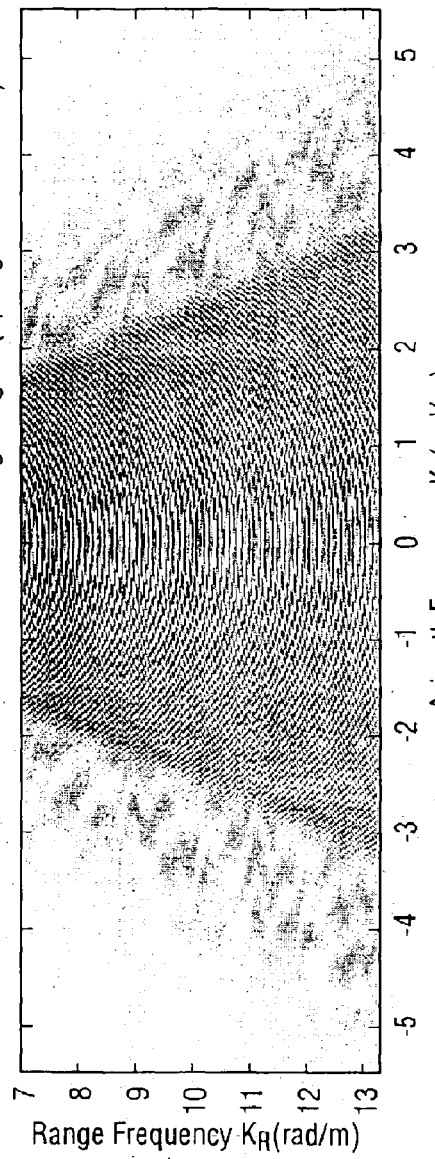

Referring now to FIGS. 10a and 10b, the results with two scatterers at center azimuth, but at near and far range with spotlight illumination will now be described. In the radial wavenumber $K_R$ by azimuth image domain of FIG. 10a, the hourglass with the pinch point near the tp represents the scatterer at near range while the hourglass with a low pinch point (but at the high transmit frequency end of fast time or range spatial frequency) represents the scatterer at far range. In the radial wavenumber $K_R$ by azimuth wavenumber $K_x$ domain of FIG. 10a, the brighter center trapezoid encompasses the support of the scatterer at far range while the larger outside trapezoid corresponds to the scatterer at near range. This difference in support is required to properly format the data in azimuth. In the extreme data collection geometry of the simulation, the scatterer at near range sees a much larger cone angle variation over the fixed synthetic aperture than does the scatterer at far range. Therefore, the scatterer at near range must have a wider support in this azimuth spatial frequency space. Again, FIG. 10b corresponds to what the prior art RMA presents to its Stolt interpolation operation. Thus, ATAFS 30 achieves the same two-dimensional data formatting via a different path that avoids the use of the initial azimuth chirp associated with the center transmit frequency.

Demonstration of the Invention: Single Scatterer Analysis

Figure 11A:
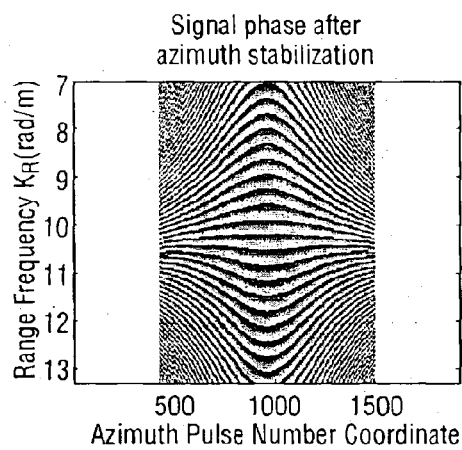
FIGS. 11a, 11b, 11c, and 11d are plots demonstrating the behavior of the DDA by illustrating the characteristics through the DDA of a single scatterer offset in range.

FIGS. 11a, 11b, 11c, and 11d are plots demonstrating the behavior of DDA 50 using the basic simulation parameters listed in the table above by illustrating the characteristics through the DDA of a single scatterer offset in range. FIG. 11a illustrates the signal phase after the azimuth data stabilization 36 within ATAFS 30. The width of the phase pattern corresponds to the series of pulses within the synthetic aperture. This compensation removes the azimuth chirp completely at the center transmit frequency (sample 385 on the vertical axis) for a scatterer located at scene center. Residual (quadratic phase) chirps remain of opposite signs at the upper and lower halves of the signal. However, because this particular scatterer is located farther from the radar than scene center, it has a slightly lower chirp rate at center frequency than a scene center target would have and, therefore, less bandwidth.

Figure 11B:
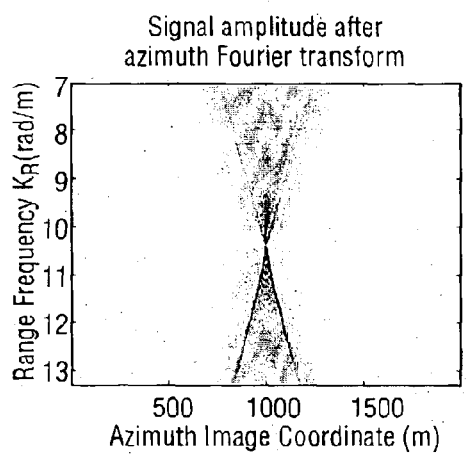

This factor has the effect of moving the pinch point in FIG. 11b after the azimuth FFT 40 to a higher frequency (downward) where the shorter wavelength increases the chirp rate to match the reference chirp rate. FIG. 11b shows the signal after a Fourier transform to compress the signal in azimuth.

Figure 11C:
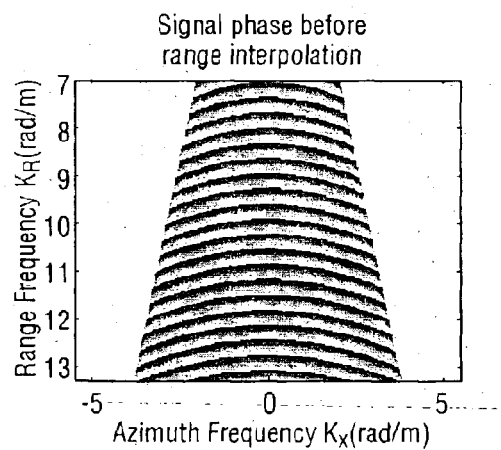
Figure 11D:
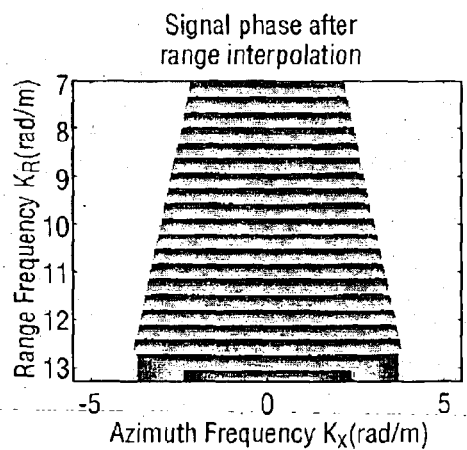

FIG. 11c illustrates the phase of the signal after phase multiply 42, an inverse Fourier transform in azimuth 44 and phase multiply 46 to move the data to an azimuth spatial frequency space which is designated as the $K_X$ coordinate. At this point, the processing of ATAFS 30 is completed. The trapezoidal shape indicates the increasing Doppler bandwidth with transmit frequency over a fixed synthetic aperture. The fringes are curved, rather than straight. The Stolt (range) interpolation is then applied to make the fringes straight as shown in FIG. 11d. The signal shown in FIG. 11d is ready for windowing, apodization, and a Fourier transform to generate an image of the scattering source.

Demonstration of the Invention: Image Generation

Figure 12:
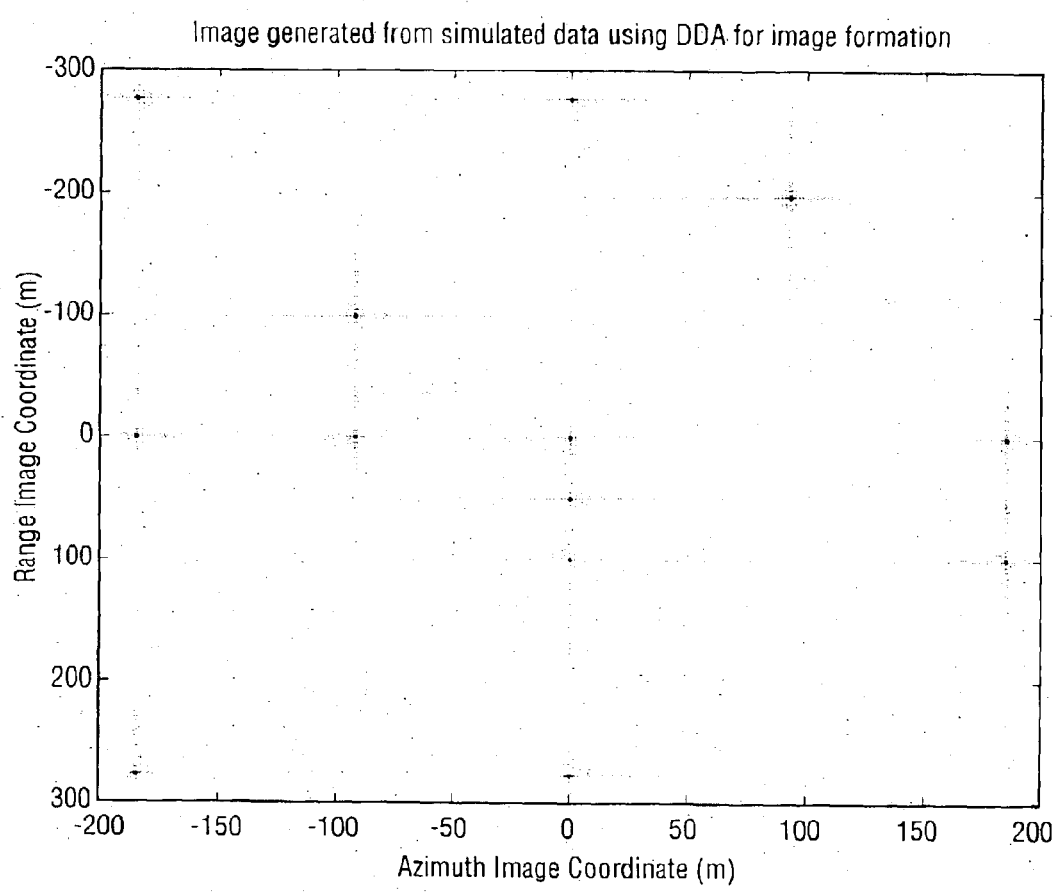
FIG. 12 is a plot illustrating an image of a simulated scene generated by the DDA.

To demonstrate the capability of DDA 50, simulated data with scatterers encompassing a wide area, far beyond that which the prior art PFA can handle, was generated. A modified (in that synthetic aperture length does not vary with range location of scatterer) strip map collection in which each scatterer has a synthetic aperture of the same length centered about its azimuth location (broadside) is simulated. FIG. 12 illustrates a plot of an image of a simulated scene generated by DDA 50 using the simulated data.

Figure 13:
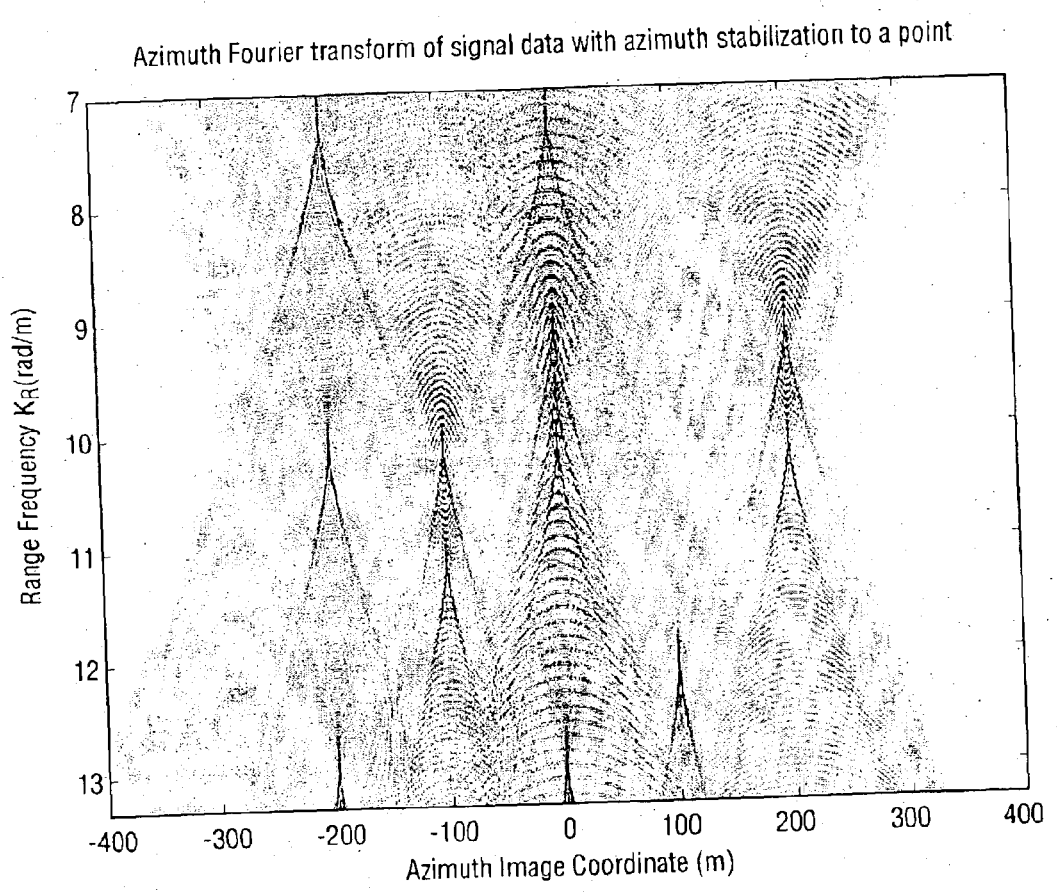
FIG. 13 is a plot illustrating the simulated scene signals in the radial wavenumber $K_R$ by nominal azimuth image domain after the initial data stabilization and azimuth Fourier transform performed by the ATAFS.

FIG. 13 illustrates a plot of the signals from this simulated data in the hourglass domain after the initial data stabilization and azimuth Fourier transform of the ATAFS operation. While each scatterer possesses an hourglass support, its pinch point in range varies with range location of the scatterer.

Figure 14:
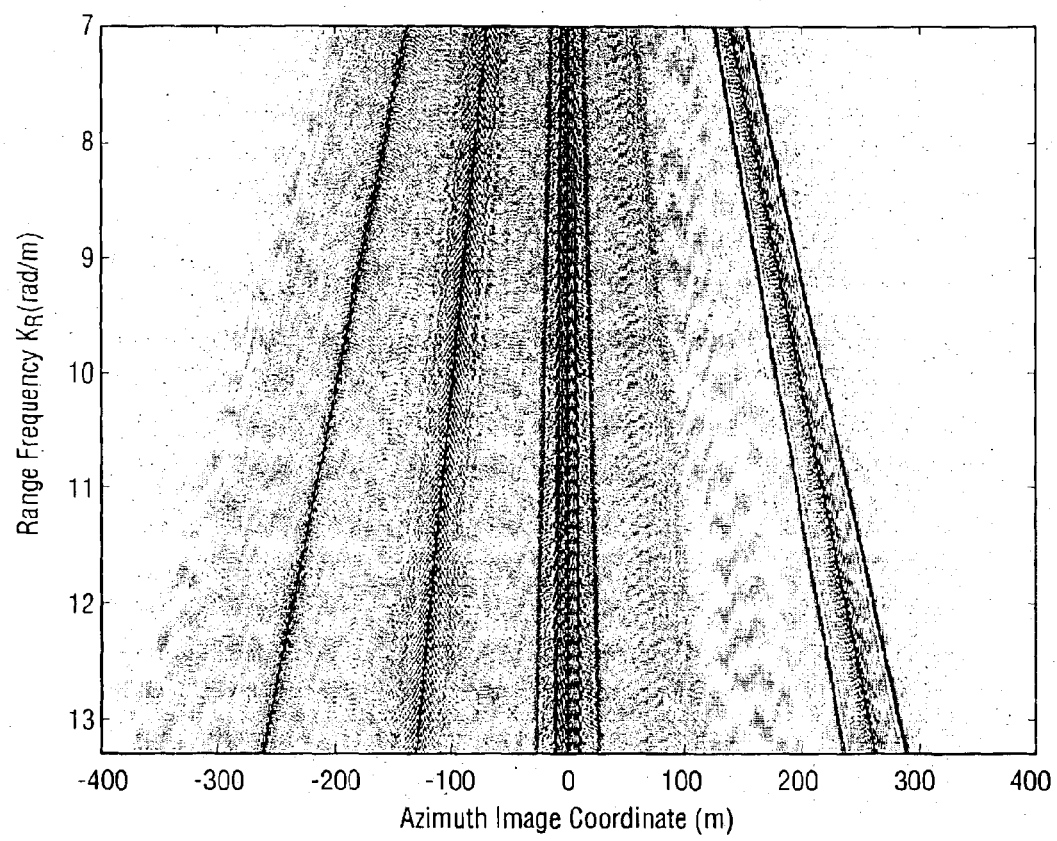
FIG. 14 is a plot illustrating the result corresponding to FIG. 13 for the simulated scene signals for the case of the complete data stabilization to a point associated with application of the prior art PFA to spotlight data.

FIG. 14 illustrates a plot of the corresponding result for the simulated scene signals for the case of the complete data stabilization to a point associated with application of the prior art PFA to spotlight data. Lacking differential Doppler bandwidth here, a tilted line motif replaces the hourglass motif of FIG. 13.

Figure 15:
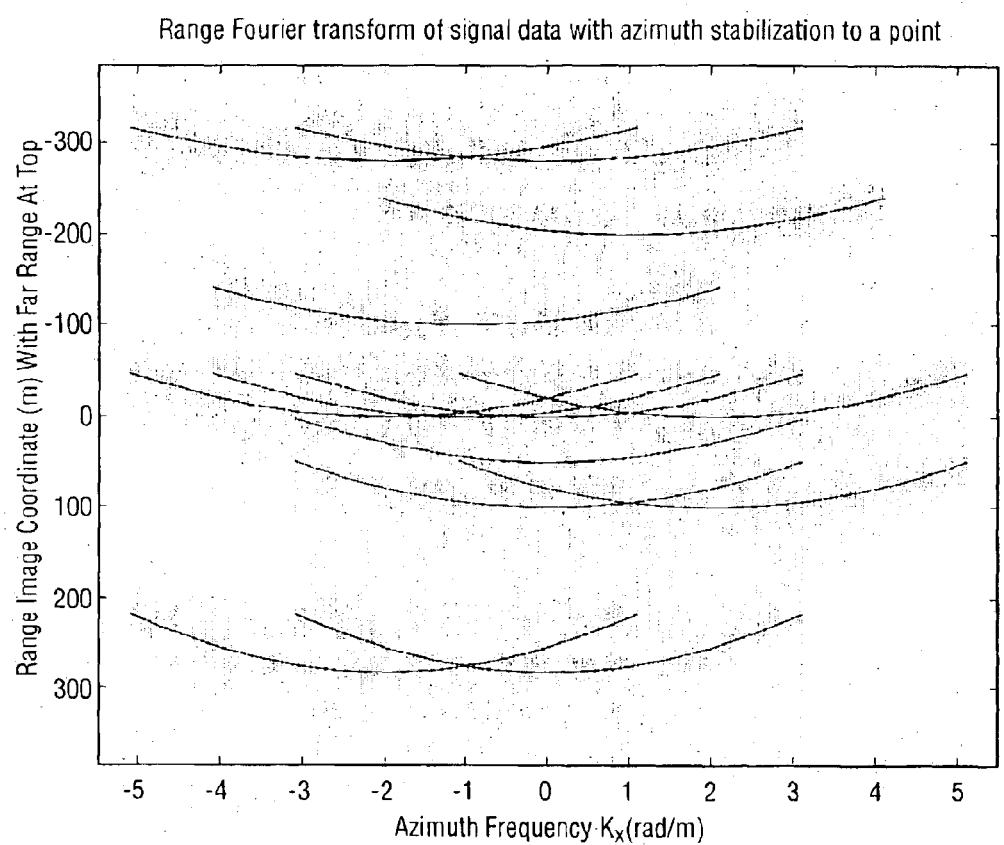
FIG. 15 is a plot illustrating the range Fourier transform of the simulated scene data with azimuth compensation only that produced the results illustrated in the plot of FIG. 13.

FIG. 15 illustrates a plot of the range Fourier transform of the simulated scene data with azimuth compensation only that produced the results illustrated in the plot of FIG. 13. The individual tracks correspond to each target's motion in range (range curvature) during the data collection. The data corresponds to a strip map collection with support offset in azimuth for scatterers at various azimuth distances from scene center.

Figure 16:
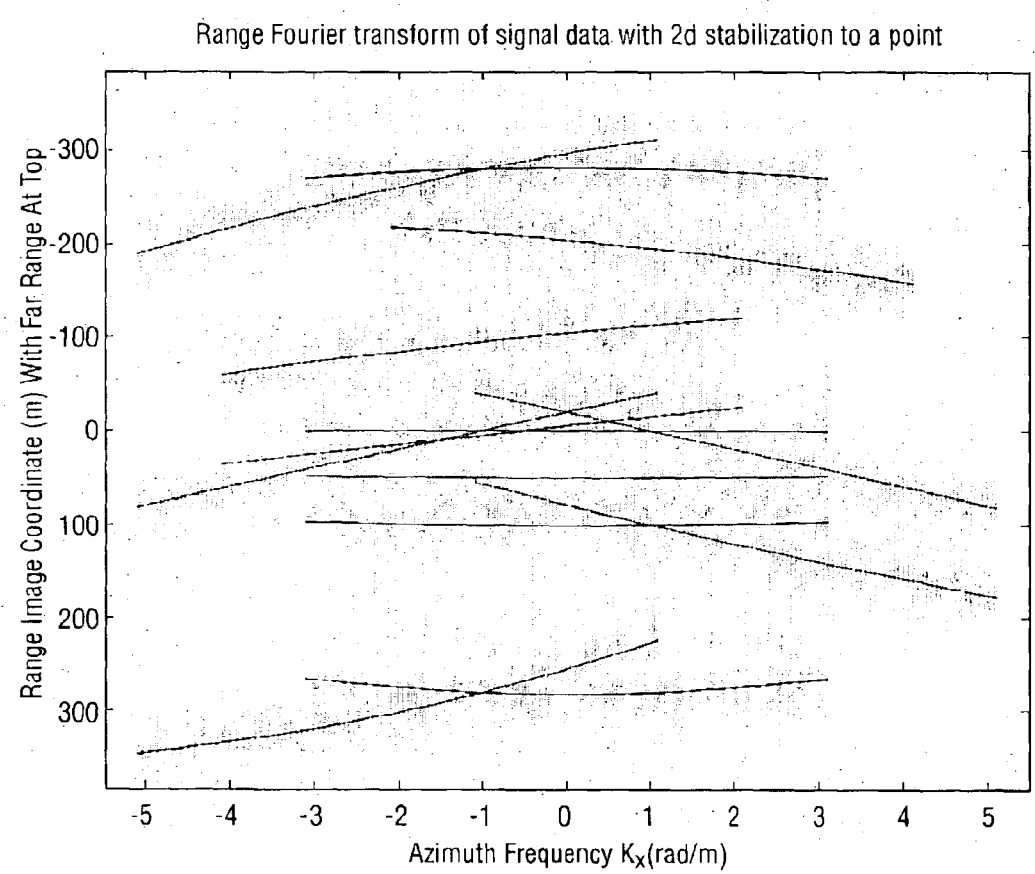
FIG. 16 is a plot illustrating the corresponding result for the case of complete data stabilization to a point (using the data that produced FIG. 14)

FIG. 16 illustrates a plot of the corresponding result for the case of completion data stabilization to a point (using the data that produced FIG. 14); having removed the range curvature associated with the scene center scatterer from all scatterers. The plot of FIG. 16 illustrates the differential range curvature (suggesting target-dependent range walk in this situation).

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method of generating a synthetic aperture radar (SAR) image from a SAR signal, the SAR signal being indicative of a scene having a multitude of point scatterers and distributed area scatterers, the method comprising:

performing a first partial data stabilization to a point operation on the SAR signal to generate a partially stabilized SAR signal, the first partial data stabilization including removing a high bandwidth azimuth chip from the SAR signal;

performing an along-track migration operation on the partially stabilized SAR signal to migrate SAR signal support of the scatterer in the scene as a function of along-track location of the scatterer in order to generate an along-track aligned partially stabilized SAR signal;

performing a second partial data stabilization to a point operation on the along-track aligned partially stabilized SAR signal in order to complete the performance of the data stabilization to a point operation on the SAR signal and thereby generate an azimuth formatted SAR signal; and processing the azimuth formatted SAR signal to generate the SAR image.

2. The method of claim 1 wherein the step of performing the first partial data stabilization to a point comprises:

using on the SAR signal a first two-dimensional phase multiplier in order to generate the partially stabilized SAR signal.

3. The method of claim 2 wherein the step of performing the along-track migration operation comprises:

using on the partially stabilized SAR signal an azimuth fast Fourier transformation (FFT), a second two-dimensional phase multiplier, and an inverse azimuth FFT in order to generate the along-track aligned partially stabilized SAR signal.

4. The method of claim 3 wherein the step of performing the second partial data stabilization operation comprises:

using on the along-track aligned partially stabilized SAR signal a third two-dimensional phase multiplier in order to generate the azimuth formatted SAR signal.

5. The method of claim 1 wherein the SAR signal has an azimuth chirp associated with a center transmitter frequency, wherein the step of performing the first partial data stabilization to a point operation on the SAR signal comprises:

removing the azimuth chirp associated with the center transmitter frequency of the SAR signal to generate the partially stabilized SAR signal.

6. The method of claim 1 wherein the SAR signal includes a plurality of pulses each having an azimuth chirp associated with a center transmitted frequency and each having a fast-time frequency, wherein the step of performing the first partial data stabilization to a point operation on the SAR signal comprises:

performing a pulse-by-pulse phase shift without affecting the fast time frequency of the pulses of the SAR signal in order to remove from the pulses of the SAR signal the azimuth chirp associated with the center transmitter frequency.

7. The method of claim 1 wherein the SAR signal has an azimuth chirp associated with a center transmitter frequency, the azimuth chirp having a quadratic component and a non-quadratic component, wherein the step of performing the first partial data stabilization to a point operation on the SAR signal comprises:

removing the quadratic component of the azimuth chirp associated with the center transmitter frequency of the SAR signal to generate the partially stabilized SAR signal.

8. The method of claim 1 wherein the SAR signal includes a plurality of pulses each having an azimuth chirp associated with a center transmitter frequency, the azimuth chirp having a quadratic component and a non-quadratic component, each pulse having a fast-time frequency, wherein the step of performing the first partial data stabilization to a point operation on the SAR signal comprises:

performing a pulse-by-pulse phase shift and adjusting the fast-time frequency of the pulses of the SAR signal in order to remove from the pulses of the SAR signal the quadratic component of the azimuth chirp associated with the center transmitter frequency.

9. The method of claim 1 wherein the step of performing the along track migration operation on the partially stabilized SAR signal to migrate SAR signal support of the scatter in the scene as a function of along-track location of the scatter in the sscene in order to generate an along-track aligned partially stabilized SAR signal comprises:

performing an azimuth Fourier transform of the partially stabilized SAR signal;

multiplying the nominal azimuth image domain of the partially stabilized SAR signal by an azimuth quadratic phase function; and performing an azimuth inverse Fourier transform of the nominal azimuth image domain of the partially stabilized SAR signal in order to migrate SAR signal support of the scatterer in the scene as a function of along-track aligned partially stabilized SAR signal.

10. The method of claim 1 wherein:

the first partial data stabilization to a point operation is a slow-time data stabilization component of the data stabilization to a point operation.

11. The method of claim 10 wherein:

the second partial data stabilization to a point operation is a fast-time data stabilization component of the data stabilization to a point operation.

12. The method of claim 1 wherein:

the SAR signal is a spotlight SAR signal.

13. The method of claim 1 wherein:

the SAR signal is a strip map SAR signal.

14. The method of claim 1 wherein:

the SAR signal is a scan mode SAR signal.

15. The method of claim 1 wherein the step of processing the azimuth formatted SAR signal to generate the SAR image comprises:

performing a range interpolation operation on the azimuth formatted SAR signal to generate an azimuth and range formatted SAR signal; and performing on the azimuth and range formatted SAR signal an azimuth and range fast Fourier transform in order to generate the SAR image.

16. The method of claim 15 wherein:

the range interpolation operation includes a Stolt interpolation operation.

17. The method of claim 15 further comprising:

performing an azimuth scaling operation on the azimuth formatted SAR signal prior to the performance of the range interpolation operation.

18. The method of claim 1 wherein the step of processing the azimuth formatted SAR signal to generate the SAR image comprises:

performing on the azimuth formatted SAR signal, in order, a range fast Fourier transform, a two-dimensional phase multiply, and an azimuth fast Fourier transform in order to generate the SAR image.

19. The method of claim 1 wherein the step of processing the azimuth formatted SAR signal to generate the SAR image comprises:

performing a polar format algorithm range interpolation operation on the azimuth formatted SAR signal in order to generate the SAR image.

20. The method of claim 1 wherein the step of processing the azimuth formatted SAR signal to generate the SAR image comprises:

performing a Stolt interpolation and an azimuth and range fast Fourier transform on the azimuth formatted SAR signal in order to generate the SAR image.

21. A method of generating a synthetic aperture radar (SAR) image from a SAR signal, the method comprising:

performing a first partial data stabilization to a point operation on the SAR signal to generate a partially stabilized SAR signal, the first partial data stabilization including removing a high bandwidth azimuth chirp from the SAR signal;

performing an along-track migration operation of the partially stabilized SAR signal to generate an along-track aligned partially stabilized SAR signal;

performing a second partial data stabilization to a point operation on the along-track aligned partially stabilized SAR signal in order to complete the performance of the data stabilization to a point operation on the SAR signal and thereby generate an azimuth formatted SAR signal; and processing the azimuth formatted SAR signal to generate the SAR image.

* * * * *